(12) United States Patent
Bonnett-Brooks et al.

(10) Patent No.: US 12,401,701 B2
(45) Date of Patent: Aug. 26, 2025

(54) SHARED STATE COLLABORATION (71) Applicant: Palantir Technologies Inc., Denver, CO (US)

(72) Inventors: Benjamin Bonnett-Brooks, Spring Hill, TN (US); Kevin Ng, New York, NY (US); Kendra Knittel, Denver, CO (US); Michelle Mingrone, Washington, DC (US); Samuel Kremin, McLean, VA (US)

(73) Assignee: Palantir Technologies Inc., Denver, CO (US)

( * ) Notice: Subject to any disclaimer, the term of this patent is extended or adjusted under 35 U.S.C. 154(b) by 363 days.

(21) Appl. No.: 18/188,887

(22) Filed: Mar. 23, 2023

(65) Prior Publication Data
US 2023/0328123 A1 Oct. 12, 2023

Related U.S. Application Data (60) Provisional application No. 63/363,872, filed on Apr. 29, 2022, provisional application No. 63/326,464, filed on Apr. 1, 2022.

(51) Int. Cl.
*G06Q 10/101* (2023.01)
*H04L 9/40* (2022.01)
*H04L 65/401* (2022.01)

(52) U.S. Cl.
CPC ....... *H04L 65/4015* (2013.01); *G06Q 10/101* (2013.01); *H04L 63/10* (2013.01)

(58) Field of Classification Search
CPC . H04L 65/4015; H04L 63/10; H04L 65/4038; H04L 12/1827; H04L 51/234; G06Q 10/101; G06F 9/542; G06F 9/543; G06F 16/24568
See application file for complete search history.

(56) References Cited

U.S. PATENT DOCUMENTS

| | | | |
|---|---|---|---|
| 2009/0143128 A1* | 6/2009 | Cautley | G07F 17/329 463/17 |
| 2013/0144620 A1* | 6/2013 | Lipton | H04L 63/18 704/E17.001 |
| 2018/0365263 A1 | 12/2018 | Mohan et al. | |
| 2019/0391861 A1 | 12/2019 | Emerick et al. | |
| 2022/0004656 A1 | 1/2022 | Thoren et al. | |
| 2022/0038752 A1* | 2/2022 | Wong | H04N 21/47202 |

FOREIGN PATENT DOCUMENTS

CN 110888845 3/2020

OTHER PUBLICATIONS

Official Communication for European Patent Application No. 23164972.4 dated Aug. 28, 2023, 9 pages.

* cited by examiner

*Primary Examiner* — Michael A Keller
(74) *Attorney, Agent, or Firm* — Knobbe, Martens, Olson & Bear, LLP (57) ABSTRACT

Streaming of shared state date from a presenter device to one or more viewer devices may be accomplished by shared state of a file (e.g., state of a presentation and/or the application that is displaying Information from the file and/or data related to the particular shared streaming of the presentation) rather than a screen share view of the application and/or file.

20 Claims, 6 Drawing Sheets

| Artifact ID | MAP-123 | | |
|---|---|---|---|
| | Event Type | | |
| User | Last Cursor Position | Last Page View | Last Selection |
| User 1 (Presenter) | [x,y] | [p] | [o] |
| User 2 (Viewer A) | [x2,y2] | [p2] | [o2] |
| User 3 (Viewer B) | [x3,y3] | [p3] | [o3] |

SHARED STATE COLLABORATION

TECHNICAL FIELD

The present disclosure relates to systems and methods for tracking state of data objects that are shared with multiple users.

BACKGROUND

When collaborating about a particular file (e.g., a document or presentation), one user may be designated as a presenter or leader who uses a screen sharing application to stream a video feed of their display. When collaborating in such a streamed video feed environment, the non-presenting users cannot directly interact with the particular application or file through the video feed.

Collaborating in a shared application or file also includes shared state problems, that require that the shared application or file be replicated for concurrent editing by multiple users but also maintain consistency. Maintaining consistency may include resolution of conflicting edits, converging to the same state across the multiple instances of the application, and the like.

SUMMARY

The matter for which protection is sought is defined by the claims.

According to a first aspect, there is provided a computer-implemented method comprising: at a collaboration device, receiving, from a presenting device, a collaboration event indicating a file accessible via a first instance of an application on the presenting device; creating an event channel configured to store event data associated with ephemeral actions performed at the presenting device, wherein each event data includes at least an event type and an event payload; receiving, from a viewer device, a request to subscribe to an artifact channel associated with the collaboration event; authorizing the viewer device to access the artifact channel, wherein the viewer device accesses the file via a second instance of the application on the viewer device; periodically receiving, from the presenting device, event data; for each received event data: identifying an event type and an event payload; storing the event payload in place of any previously stored event payload associated with the event type; identifying one or more viewer devices subscribed to the artifact channel; periodically receiving requests from the viewer device for the latest event data associated with the artifact channel; and providing the requested latest event data to the viewer device, wherein the latest event data is usable by the second instance of the application to simulate a current display of the file in the first instance of the application on the presenting device.

The file may be one or more of a presentation, a document, a spreadsheet, database, or a map.

The file may include one or more artifacts that are accessed from an artifact data store, wherein the first instance of the application and the second instance of the application separately access the one or more artifacts from the artifact data store.

Event data from the first instance of the application indicating a change to a first artifact of the one or more artifacts may be implemented at the second instance of the application in response to receiving the latest event data at the viewer device.

The artifacts may each comprise one or more of a map, an image, a table, a text block, or an object.

The event types may include one or more of hovering, cursor position change, page change, selection of an artifact, resizing of an artifact, or changes to an artifact in the file.

The method may further comprise: determining access rights of the viewer device to the application.

The method may further comprise: determining access rights of the viewer device to the file.

The event data may further include an object ID associated with an artifact.

The collaboration system may be configured to store, for each artifact associated with the file, an artifact table storing event data associated with the respective artifact.

The artifact table may store indications of viewer devices or viewers that have the artifact open.

The artifact table may store event data with custom event types associated with an artifact type.

The collaboration system may be configured to store, for each of the presenting device and the viewer device, a user state table indicating status of the respective user and, optionally, wherein the user state tables store an indication of whether the respective user is online or offline.

The artifact table may store event data with custom event types associated with an artifact type.

According to another aspect, there may be provided a system comprising one or more processors; and a memory storing instructions that, when executed by the one or more processors, cause the system to perform the method of the first aspect.

A screen sharing application does not include functionality that allows non-presenting users to view data attributes and/or history of data objects that are displayed, using linked data objects to connect to other objects that are not displayed, and/or viewing other portions of the file than are displayed. Instead, the non-presenting users may need to have the particular application or file opened separately and interact there. Furthermore, a streamed video feed showing the displayed data objects may have different security features than the underlying application or file, or may require that some other feature or check is used to ensure that only authorized users are able to view the presentation.

As disclosed herein, a collaborative streaming system allows streaming data representing a state of a file (e.g., state of a presentation and/or the application that is displaying Information from the file and/or data related to the particular shared streaming of the presentation) rather than a screen share view of the application and/or file. In some embodiments, only users with access to the underlying file via the same (or other authorized) application can view the current state of the file (e.g., presentation) and participate in the collaboration. This allows for enhanced and consistent security that is seamless with the application or file.

Furthermore, the collaboratively streaming of the state of the presentation allows non-presenting users to interact with data objects and the like within the file via their own instance (e.g., local and/or cloud) of the application. Such interactions for non-presenting users may include viewing data attributes and history of data objects that are displayed, using linked data objects to connect to other objects that are not displayed, viewing other portions of the file than are displayed, and accessing other functionality of the application.

Similarly, non-presenting users may be able to view other parts of the file and use other functions of the application, such as navigating and interacting with other portions of the file, without interrupting the presenter or the experience of other non-presenting users. The non-presenting users may also be able to see what the presenter is currently viewing and interacting with so they can focus back to the presenter's view at any time. In some embodiments, a particular non-presenting viewer may have a comment or question about a particular part of the application or file. The presenter and other non-presenting viewers can see an indication of what the particular non-presenting viewer is viewing, or the particular non-presenting viewer could be temporarily made a presenter.

Additionally, collaboratively streaming of the state of a file (e.g., presentation) may allow simpler maintenance of the file (e.g., presentation) during collaboration. In one embodiment, a collaboration streaming system stores and sends data representing only updates, or deltas, of the latest action for each of multiple event types, such as storing only the latest page change action for a page change type action, and not every previous page change. By only storing and sending the latest action, these event types are regarded as having ephemeral states. Other event types with ephemeral states might include, for example, cursor location, laser pointer location, a user or presenter changing view from one portion of a presentation to another, any expanded interactive elements or detail shown within a slide, such as panning/zooming on an image or other artifact from another application. Applications can also define other event types that should have ephemeral states.

In some embodiments, certain event types may have a tracked state where at least some history of actions taken is stored, such as in the form of operational transforms. Event types with tracked states might include edits made to the contents of a file and outputs of a file based on particular inputs. Applications can also define other event types that should have tracked states.

In some embodiments, the latest actions may be sent (from the presenting user) to a server that stores the actions, by action type, and makes them available to authorized viewers (e.g., non-presenting users), in a publication/subscription model. This may reduce the amount of communication needed to provide the shared state information with any number of non-presenting users by focusing on only the latest actions of the presenter and/or viewers. These kinds of reductions can make collaboration simpler and require less storage, bandwidth, and the like.

In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, design of computer user interfaces that are useable and easily learned by humans is a non-trivial problem for software developers. The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

DETAILED DESCRIPTION

Overview

Embodiments of the present disclosure relate to an apparatus and method (that is, computer-implemented method) and system for streaming of shared state date from a presenter device to one or more viewer devices. In one embodiment, a collaborative streaming system allows streaming data representing a state of a file (e.g., state of a presentation and/or the application that is displaying Information from the file and/or data related to the particular shared streaming of the presentation) rather than streaming a screen share view of the application and/or file. In some embodiments, only users with access to the underlying file via the same (or other authorized) application can view the current state of the file (e.g., presentation) and participate in the collaboration. This allows for enhanced and consistent security that is seamless with the application or file.

Furthermore, the collaboratively streaming of the state of the presentation allows non-presenting users to interact with data objects and the like within the file via their own instance (e.g., local and/or cloud) of the application rather than merely viewing what the present user wants them to view via a screen share application. Such interactions for non-presenting users may include viewing data attributes and history of data objects that are displayed, using linked data objects to connect to other objects that are not displayed, viewing other portions of the file than are displayed, and accessing other functionality of the application.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Ontology: Stored information that provides a data model for storage of data in one or more databases. For example, the stored data may comprise definitions for object types and property types for data in a database, and how objects and properties may be related.

Artifact: any object that multiple users can collaborate around, such as a map, spreadsheet, object oriented graph, image, presentation, etc. Artifacts may be associated with artifact events stored in an artifact table, which may be accessed on opening of an artifact, for example. Artifact events may include any information regarding the artifact, such as an artifact ID, one or more users that also have the artifact open, any active presentations that include the artifact, the latest events published for the artifact, such as grouped by user ID, client ID, and/or event type. Artifacts may be interactive and/or manipulable. In some implementations, an artifact may include unique identifiers associated one or more data objects, where the identifiers are usable to query a data store for further information or properties associated with the data objects. In some embodiments, an artifact may include additional information associated with the one or more data objects.

Artifact state: information that may be used to reproduce the current state of an artifact, such as to indicate interactions from multiple users. An artifact state may be maintained using operational transforms (see below), which generally records a history of events associated with the artifact by all users. However, operational transform tables may become bloated with repetitive and unnecessary data when attempts are made to store ephemeral events as operational transforms. For example, an ephemeral event such as location of the cursor of each of multiple users may quickly produce a massive set of historical event data that likely isn't important, since only the current cursor location of the presenter (and perhaps the viewers) is likely the most important data. Thus, as discussed herein, in addition to (or as an alternative to) storage of operational transform state, an artifact state may include separate ephemeral state data for certain actions wherein operational transform data is not necessary or desired, such as pointer location, last page view, etc.

Event Data (or "Action Data"): an event (or action) is generally any interaction or change associated with an artifact. Event data (or action data) associated with an event typically includes at least an event type and an event payload. An event type may indicate the type of event, such as a cursor movement, page view, selection, etc. and the event payload includes one or more values associated with the event type. For example, a cursor movement event type may be associated with an event payload including coordinates (e.g., an x and y position) of the cursor. Similarly, a page view event type may indicate when the page view of a presentation has occurred (e.g., changed by the presenter), so the event payload may indicate the current page. Certain event types may be used for any or all types of artifacts, and custom events may be specific to particular artifact types.

User State: information regarding current state of a user, such as whether the user is online or offline, active browser tab, artifacts that are open, presentations viewing, presentations giving, and/or other metadata. User state information may be stored in a user state table. A user may provide updates to the user state table using an update user state call that includes updated user state data. An update user state call may be transmitted periodically (e.g., every 10 seconds, every minute, etc.) or in response to a particular change of the user state. The rate and/or triggers for transmitting updated user state data may vary based on the user, application, and/or any other customizations. For example, a presenter may transmit updated user state data more frequently (e.g., every one second) than viewers of the presentation, which may transmit updated user state data less frequently (e.g., every 10 seconds or more).

Event Channels: endpoint within a network that a user may subscribe to in order to receive event data for a particular artifact. For example, an artifact channel provides access to an artifact table, which may comprise a data structure storing event data associated with a particular artifact. An artifact table may include a user ID, device ID, artifact ID, event type, timestamp, event payload, and/or other attributes. A particular artifact may have multiple entries in an artifact channel, such as to indicate events associated with multiple users. As another example, a presentation channel (which could be one type of an artifact channel in some implementations) provides access to a presentation table, which may comprise a data structure that includes information regarding a presentation (e.g., a specific type of artifact), such as presentation ID, event type, timestamp, event payload, and/or other attributes of a presentation. As another example, a public events channel provides access to a public events table, which may comprise a data structure that includes information regarding current and/or planned events, such as presentations that are currently being presented and/or planned presentation times. In some embodiments, a public events channel may filter events that are shown to a particular user based on access rights associated with that user. For example, a user with a high level of access rights may view multiple ongoing presentations while another user with limited access rights may view only a single of those multiple ongoing presentations.

User: A single person or a group of users, such as, for example, organizations, groups, and business entities. In some embodiments, user refers to a computing device of a user rather than, or in addition to, an actual human operator of the computing device. As used herein, users are typically presenters (or presenter device) or viewers (or viewer device), but any other individual that interacts with systems discussed herein may be a user.

Operational Transforms: A system for tracking operations (e.g., events) that are performed on a dataset (e.g., a file or artifact) by multiple users. Multiple users can interact with an artifact, such as a document, by performing operations (e.g., adding, changing, or deleting characters). The artifact may be transformed based on the received operations from multiple users. However, the operations may be submitted at different cadences from different users, e.g., one user might submit operations in real-time, while another might submit only daily and another submits only when online. Thus, an operational transform system typically stores an action history indicating all operations from all users so that the artifact may be properly transformed based on operations from the multiple users.

In some embodiments, an operational transformation (OT) system may be implemented at a backend server and/or a frontend server. A backend OT engine can receive event data associated with artifacts from multiple instances of a frontend workspace UI, such as a document editing application. The backend OT can resolve updating/altering of artifacts and states by sequentially implementing operations (e.g., events) from multiple instances of the frontend workspace UI. The frontend OT engine may periodically request the latest transformed operational inputs from the backend OT engine, at which point the frontend OT engine can reconcile a current state of the artifact with the operations performed by other users using other instances of the workspace UI.

Example System Overview

Figure 1:
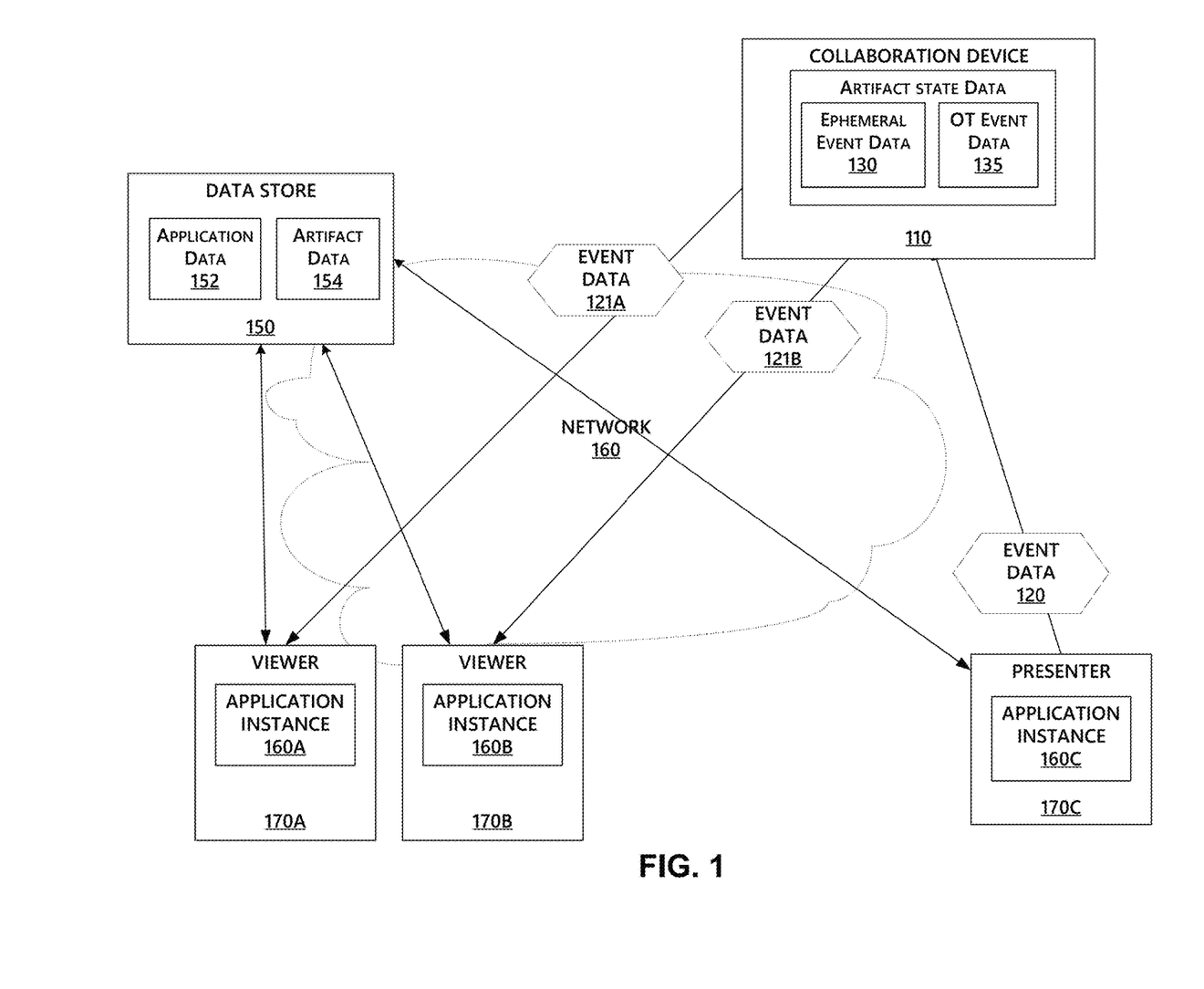
FIG. 1 is a block diagram illustrating an example collaboration device in communication with multiple user devices (including a presenter device and viewer devices).

FIG. 1 is a block diagram illustrating an example collaboration device 110, comprising one or more processors, in communication with multiple user devices 170 (including presenter device 170C and viewer devices 170A and 170B). In this example implementation, the collaboration device 110 is configured to store artifact state data in multiple formats, including operational transform event data 135 and ephemeral event data 130. In general, the presenter device 170C executes an application instance 160C of a software application, such as a word processor, spreadsheet application, presentation application, map application, proprietary application, or any other application. For ease of illustration herein, a presentation application is referred to in many of the examples. However, the functionality discussed with reference to these examples is also applicable to other types of applications and artifacts.

In the example of FIG. 1, the application data 152 represents a network accessible endpoint that is accessible to create application instances 160 on multiple user devices. In other embodiments, the application instances may be separate standalone applications installed on individual user devices. In the example of FIG. 1, the artifact data 154 represents one or more storage devices that maintain information regarding artifacts, such as those that are included in shared files. The artifact data 154 may be structured in any manner, such as a database, table, linked object hierarchical structure, etc.

When the presenter 1 device 70C wishes to share a file (where a file is generally a type of artifact that includes other artifacts, such as a presentation that includes images, text blocks, sounds, animations, linked data object, and/or other artifacts), the user may send by electronic means a sharing request to the collaboration device 110 indicating that the presentation is available for sharing with authorized users. In some embodiments, authorized users are those that have access to the particular application (e.g., a presentation software application or proprietary application that is being used by the presenter 170C) and to the particular file that is being shared (e.g., the particular presentation, file, and/or individual artifact). The authorized users may be known in advance and may be indicated to the collaboration device 110 with the sharing request and/or the collaboration device may have access to reference data indicative of the authorized users and how to electronically alert those authorized users. The collaboration device 110 may then add that presentation to a public events channel that is accessible to the viewers 170. The viewers 170 may be alerted by electronic means to a new presentation in the public event channels and/or may manually navigate to the public event channel, to indicate that they would like to view the shared presentation.

If a user indicates a desire to participate in a shared presentation, the viewer requests access to an event channel from the collaboration device 110, such as a presentation channel in the example of sharing a presentation. When subscribed to the event channel for the particular presentation, the viewer is authorized by the collaboration device 110 to receive event data indicating ephemeral events associated with the presentation occurring at the application instance 160C. In the example of FIG. 1, event data 120 represents event data (e.g., an event type and an event payload) that may be transmitted to the collaboration device 110, and stored in the ephemeral event data store 130. The collaboration device 110 may then process the event data 120 and transmit the event data 121, which may be the same or a modified version of the event data 120, to each of the application instances 160A, 160B of the viewers 170A, 170B. The application instances 160A, 160B can then update a local instance of the shared file as indicated in the received event data 121.

Depending on the embodiment, some or all of the functions discussed herein, for example with reference to the collaboration device 110, viewer device 170A, 170*b*, presenter device 170C, etc., may be performed via executable software instructions configured, which, when executed on one or more controllers or processors of an apparatus, perform the operations or functions.

As shown, the devices 170 are in communication with the collaboration device 110 via a network 160, which may include any combination of networks, such as a radio access network (RAN), LAN, WAN, and/or the Internet. The devices 170 may interact with the collaboration device 110 to execute the various functions of the collaboration device 110 as described in greater detail herein. As shown, the devices 170 may also communicate with the data store 150, such as to execute or instantiate an instance of an application stored in the application data 152 and/or to access artifact data stored in artifact data store 154.

In other embodiments, the data store 150 may be part of the collaboration device 110. The data store 150 can include any computer readable storage medium and/or device (or collection of data storage mediums and/or devices), including, but not limited to, one or more memory devices that store data, including without limitation, dynamic and/or static random access memory (RAM), programmable read-only memory (PROM), erasable programmable read-only memory (EPROM), electrically erasable programmable read-only memory (EEPROM), optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. As another example, the data store 150 can also include a hosted storage environment that includes a collection of physical data storage devices that may be remotely accessible and may be rapidly provisioned as needed (commonly referred to as "cloud" storage).

Figure 2:
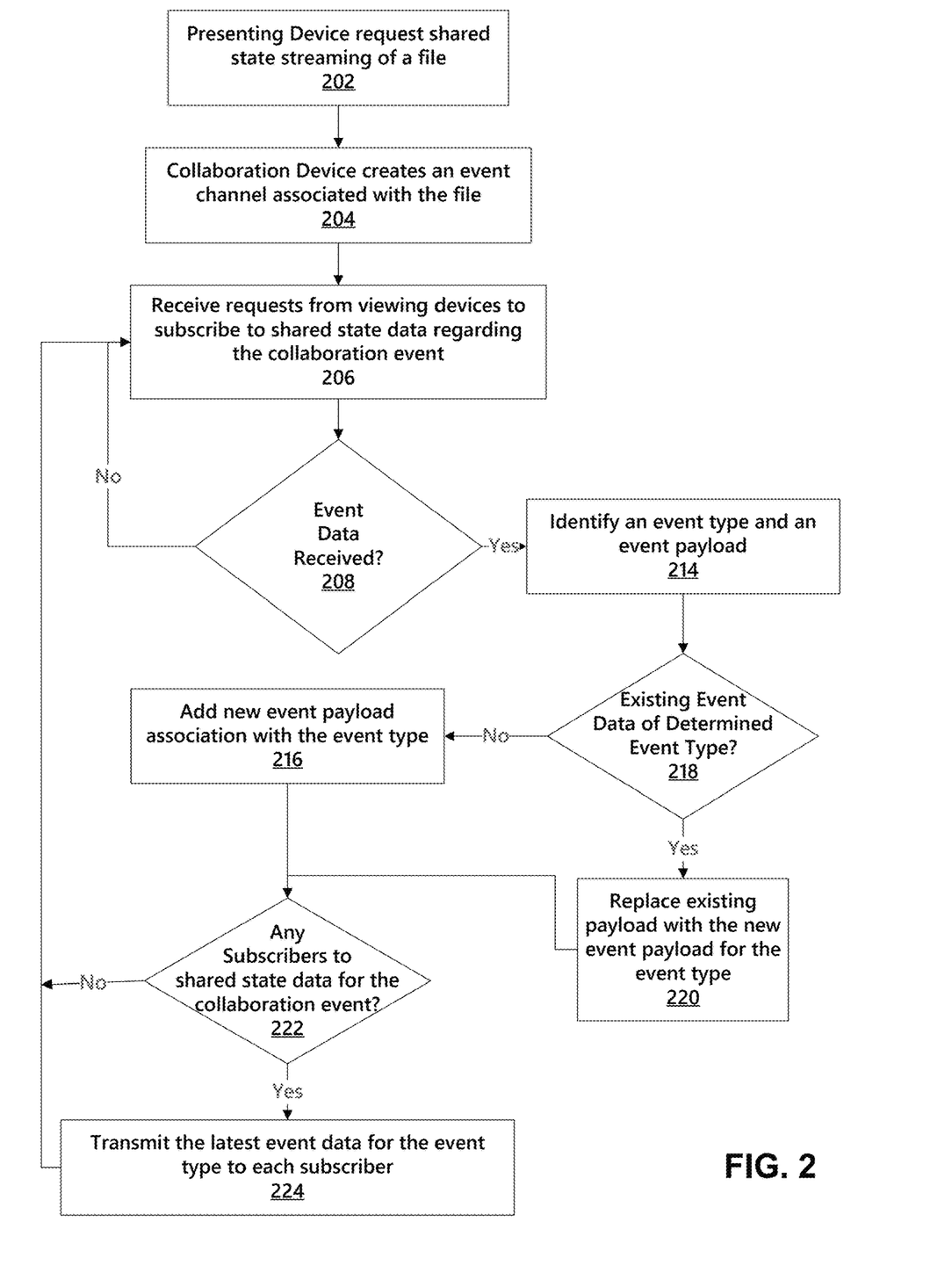
FIG. 2 is a flowchart illustrating one embodiment of a method that may be performed by a collaboration device to provide shared state data to multiple network-connected devices.

FIG. 2 is a flowchart illustrating one embodiment of a method that may comprise operations, e.g., processing operations, that may be performed by a collaboration device to provide shared state data to multiple network-connected devices. The operations may be performed using hardware, software, firmware or a combination thereof. The numerical order of reference numerals is not necessarily indicative of order or processing. For ease of explanation, the process of FIG. 2 is described with reference to components in FIG. 1, such as the collaboration device 110, presenter device 170C, and viewer devices 170A and 170B. However, the process may be performed by other devices in other network configurations. Furthermore, depending on the implementation, the process may include fewer or additional blocks and/or the blocks may be performed in order different than is illustrated.

Figure 4:
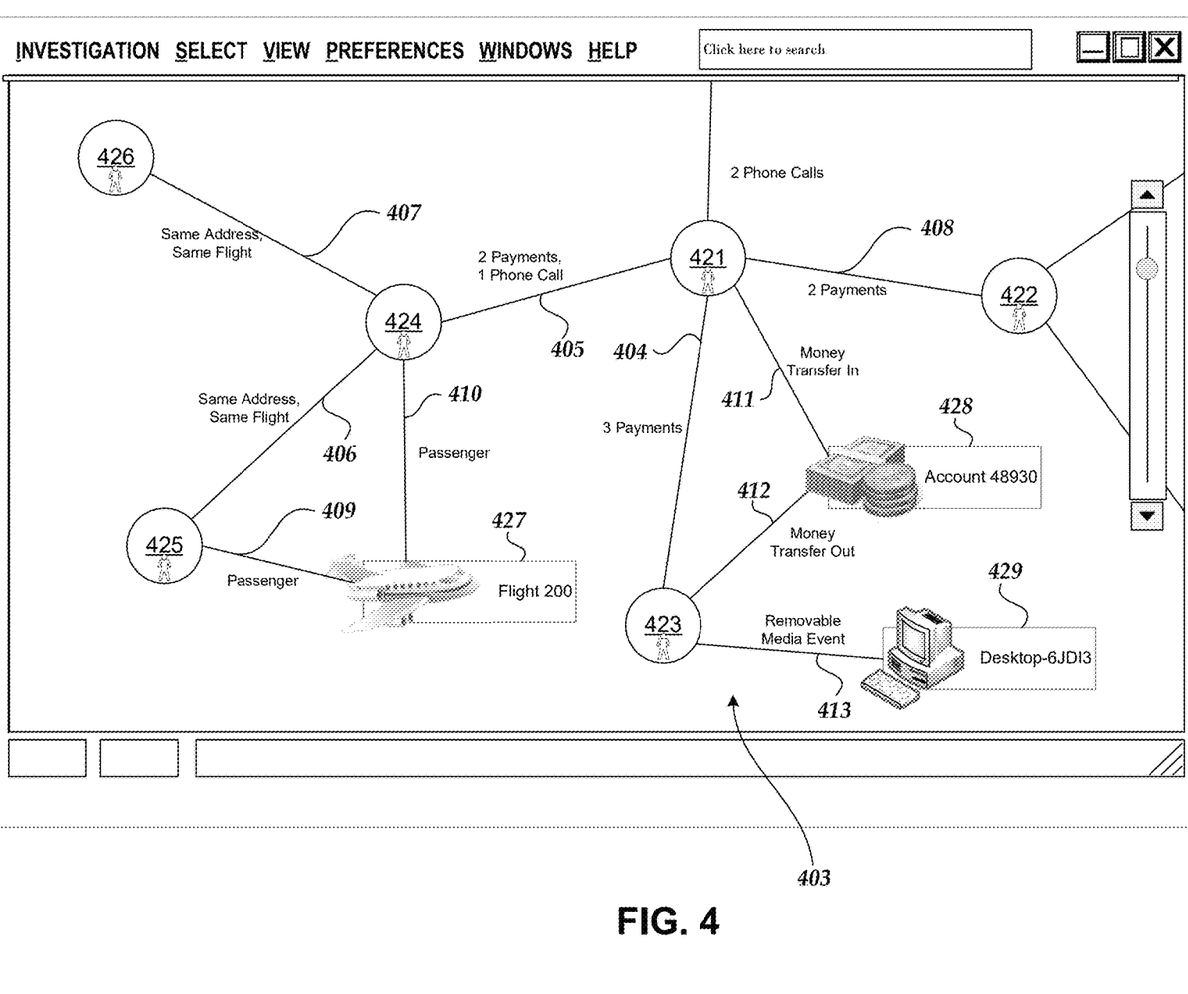
FIG. 4 is an example user interface of a software application depicting relationships of objects stored according to a dynamic ontology, which may be accessible via commercial or a proprietary application, and for which state information may be shared amount multiple users.

Additionally, while the discussion below references shared state streaming of data associated with a presentation, the functionality is equally applicable to other types of files, such as documents, spreadsheets, maps, object browsers, etc. For example, FIG. 4 illustrates an instance of a software application displaying a user interface depicting relationships of objects stored according to a dynamic ontology, which may be accessible via commercial or a proprietary application, and for which state information may be shared amount multiple users. In the example of FIG. 4, properties, objects, and links (e.g. relationships) between the objects can be visualized using a graphical user interface (GUI). The graph representation 403 of relationships (including relationships and/or links 404, 405, 406, 407, 408, 409, 410, 411, 412, and 413) between the data objects (including data objects 421, 422, 423, 424, 425, 426, 427, 428, and 429) that are represented as nodes. In this example, each of the data objects (e.g., person objects 421, 422, 423, 424, 425, and 426; a flight object 427; a financial account 428; and a computer object 429) may also be artifacts. Changes to a data object may be stored in the artifact data 154 (or other data store) such that subsequent request for the data object include the changes.

Figure 3:
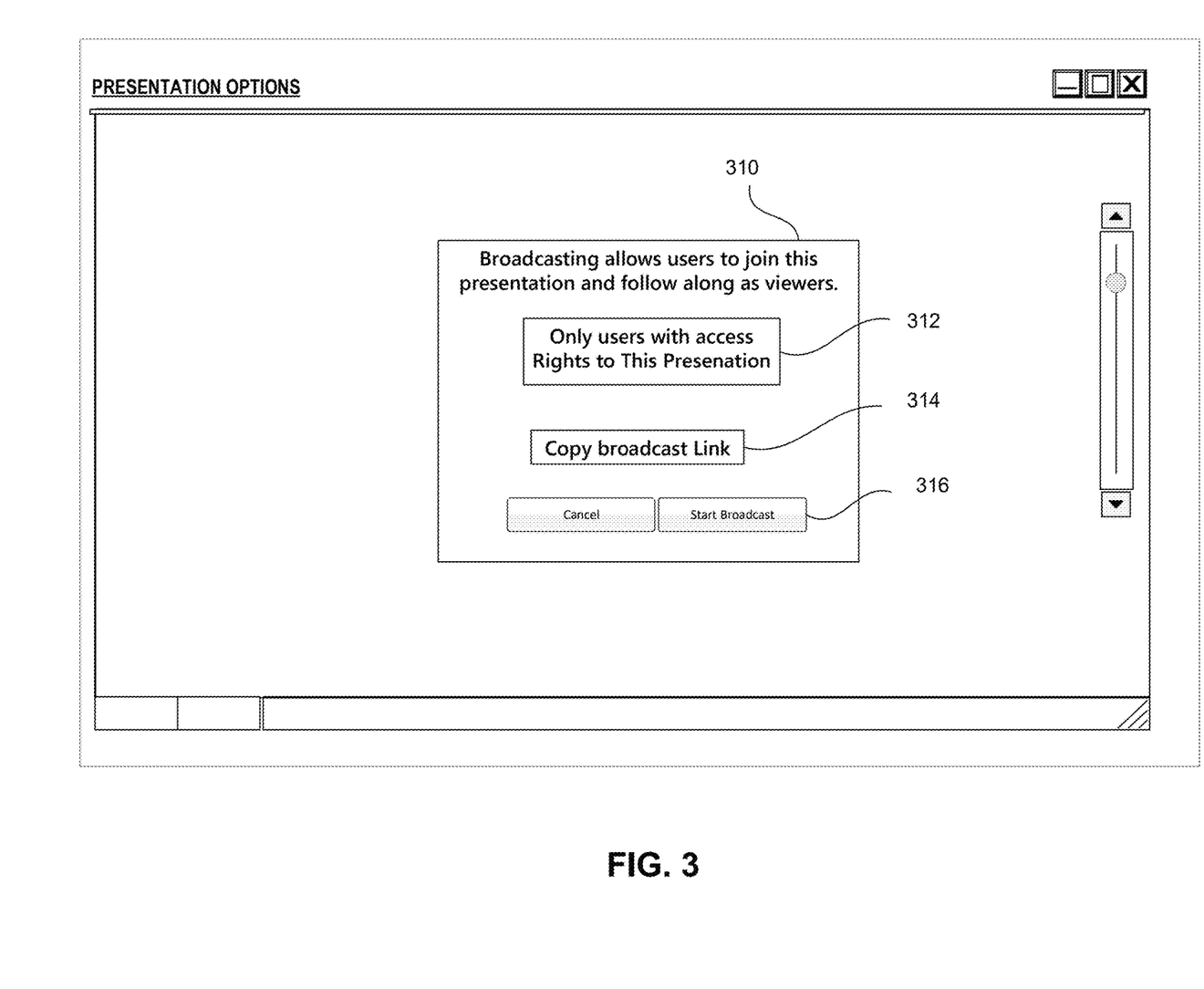
FIG. 3 is an example user interface that allows a presenter to establish limits to viewers that can access a broadcast presentation.

Returning to FIG. 2, at block 202 an operation may comprise a presenting device requesting shared state streaming of a file. The presenting device 170C may identify a file, such as a presentation that includes multiple artifacts, for broadcasting to other users. For example, a member of a business team may want to share a presentation with other team members without the need for streaming video data duplicating the presenter's screen (or portion of the presenter screen), and allowing the viewers to independently navigate the presentation, interact with artifacts within the presentation, etc. Thus, the presenter (the user of the presenter device 170C) may select a "start sharing" or similar button or menu option to initiate sharing of the presentation. In response to indicating a desire to share a presentation, which may also be referred to as "broadcasting," a user interface such as the example of FIG. 3 may be displayed. In FIG. 3, the window 310 allows the presenter to establish limits to viewers that can access the broadcast presentation by selecting button 312 and/or to copy a link to the broadcast via button 314. In some embodiments, the default access privileges required for joining a broadcast (e.g., of a presentation or other file) are that the viewer must have access to the application (e.g., the presentation application in the case of a presentation or a graph application in the case of a shared graph representation, such as graph 403). Because each viewer will be accessing the file independently in an instance of the application, each of the viewers must have access to execute an instance of the application on their viewer device. In some implementations, those that receive, by whatever means, the window 310 but who do not have an instance of the application will not be able to join the broadcast.

Additionally, access rights may be limited to certain users or groups of users, such as those with certain security privileges, within a particular workgroup, with a particular title, at a particular geographic location, or any other criteria. In some embodiments, the presenter can set the access rights via another user interface (not shown) that is presented when button 312 is selected. The button 314 copies a broadcast link to the clipboard and allows the presenter to paste the link in a communication (e.g., email, chat, etc.) to desired viewers. When a potential viewer clicks on the link, any access rights established by the presenter are checked and any users that are not authorized to receive state information regarding a presentation (or other file) will not be allowed to access the shared state information. In the example of FIG. 3, once access rights have been established and/or a broadcast link has been transmitted to potential viewers, the presenter can select the start broadcast button 316 to start sharing state information with authorized viewers.

Figure 6:
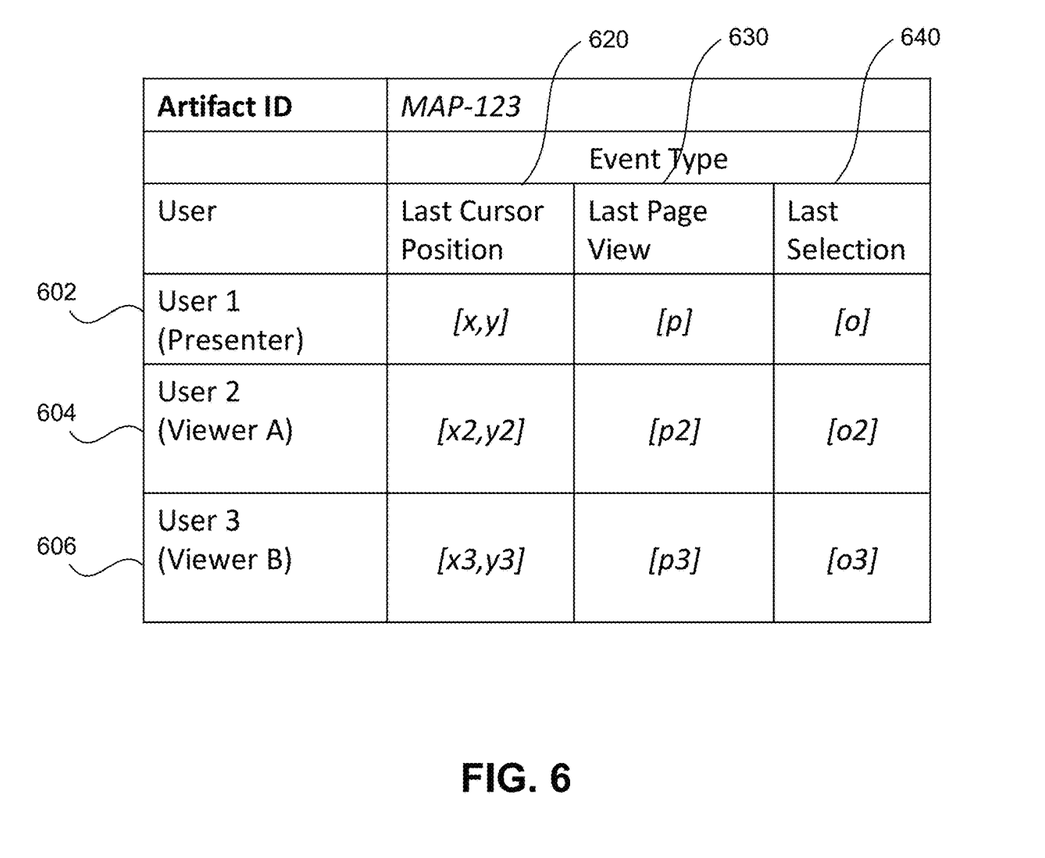
FIG. 6 is an example of a portion of an artifact table associated with an example presentation channel.

Returning to FIG. 2 and moving to block 204, another operation may comprise the collaboration device creating an event channel associated with the file. The file may store state data regarding the file for sharing with authorized viewer devices. In the case of a shared presentation, a presentation channel may be created by the collaboration device 110, such as in the ephemeral event data store 130. The presentation channel is an endpoint that the authorized viewers 170A and 170B can communicate with to receive event data associated with the presentation. In some embodiments, the presentation channel stores a presentation table (or other data structure) that stores event data received from the presenter device 170C. For example, a presentation table may store, for each event, an event type, time stamp, event payload and/or other attributes. An example artifact table, in this case for a presentation, is illustrated in FIG. 6, which is discussed further below.

In some embodiments the collaboration device, which may be considered a shared-state streaming backend service, exposes an API that is used by applications to communicate information about their user's session state and event channels used by applications to subscribe to other users' session. Each of the viewer devices may access a frontend library that provides access to different types of event data and allows certain interaction with the shard state file and/or artifacts.

In some embodiments, the frontend library allows users (e.g., the presenter and/or viewer) to define "custom presentation actions" and/or "custom artifact actions", as well as attributes of the custom presentation state and/or custom artifact state. The collaboration device (e.g., the shared-state streaming backend service) ensures that application-specific artifact and presentation actions, as well as general actions related to viewers, are aggregated and transmitted to the appropriate viewers, and keeps track of the minimal set of recent events necessary for a viewer (e.g., a viewer device) to re-create the state from scratch, in the case of a new client loading an object or an existing viewer refreshing its browser window or a viewer joining a presentation after it has begun.

Moving to block 206, another operation may comprise the collaboration device receiving requests from viewer devices to subscribe to shared state data regarding the collaboration event. For example, users that are authorized to view the broadcast presentation may receive a notification when a broadcast is started (e.g., by the presenter selecting the start broadcast button 316 in the example of FIG. 3). Similarly, users that receive the broadcast link from a presenter may select the link to send a request to the collaboration device to subscribe to the shared state data.

Figure 5:
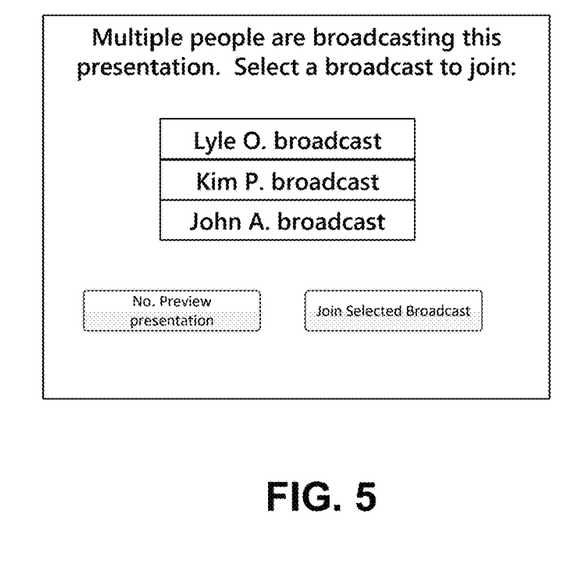
FIG. 5 is an example user interface that may be displayed to a viewer when there are multiple broadcasts of a particular file.

In some embodiments, multiple presenters may be concurrently broadcasting from a same file (e.g., the same presentation). FIG. 5 is an example user interface that may be displayed to a viewer when there are multiple broadcasts of a particular file. In this example, the viewer is notified that three different presenters are broadcasting the same presentation, and the viewer can select a broadcast to join. Each of the three broadcast streams may be associated with separate presentation channels and corresponding presentation table that stores event data associated with the particular broadcast. Thus, not only can multiple presenters concurrently access a same presentation (or other file), but multiple viewers can participate in the broadcast of each of those separate broadcasts of the presentation. This is possible because each of the viewers executes their own instance of the application (e.g., application instance 160A, 160B, and 160C in the example of FIG. 1) and the artifacts within the shared file (e.g., from artifact data store 154). Accordingly, if a user (e.g., the presenter or a viewer) makes a change to an artifact in a presentation, that change is stored in the artifact data store 154 and subsequent accesses of the artifact data will include that change.

Next, at block 208, another operation determines if event data is received. For example, the collaboration device may periodically receive event data from the presenter device 170C. As noted above, the event data typically includes at least an event type and an event payload. The event data is stored in a table (or other data structure) that is accessible to subscriber to the presentation channel. For example, in some embodiments, when a change is made to the presentation table based on event data from the presenter device, that change is pushed to each of the viewer devices that is participating in the broadcast. In other embodiments, the viewer devices periodically request updates to the presentation channel, which are provided by the collaboration device in response to the requests.

FIG. 6 is an example of a portion of an artifact table associated with an example presentation channel. In this example, event data from each of the presenter and multiple viewers is stored and accessible to other participants in the broadcast. For example, a last cursor position for each of the presenter (row 602), viewer A (row 604), and viewer B (row 606) is stored in column 620. In this example, the event payload for the last cursor position event type is stored as coordinate (e.g., an x and y coordinate). However, in other embodiments the position may be stored in another format. Similarly, a last page view for each of the users is stored in column 630 associated with a page view event type as a single value, p, which may indicate a page number. Finally, a last section for each of the participants is stored in column 640 associated with a last section event type as a single value, o, which may indicates a section number or identifier. FIG. 6 is intended only as an illustration of a format of event types and event payloads that may be stored by the collaboration device to indicate the state of ephemeral data associated with a presentation. Any other event type and payload format may be used in other embodiments.

Returning to FIG. 2, if event data is received at block 208 (e.g., the event data 120 is transmitted from the presenter device 170C), the method continues to block 214 where the event type and event payload are identified. Next, at block 218, another operation comprises determining if there is existing event data of the determined event type. For example, the collaboration device may determine if the presentation channel has already stored event data of the determined event type for that particular presentation. If event data of the determined event type does not already exist in the presentation table, or if an event payload for the event type has not been stored, the method continues to block 216 where an operation of adding a new event payload associated with the event type. For example, the event type and event payload are added to the presentation table, such as in a new column in the example in FIG. 6. However, if event data of the determined event type already exists in the presentation table, the method continues to block 220 where an operation of replacing the existing payload with the new event payload for the event type is performed. For example, the existing event payload is updated with the event payload of the newly received event data. For example, if the event data received from the presenter device indicates a last cursor position event with an event payload of (x,y), and a last cursor position event type is already included in the presentation table with an event payload of (a,b), the event payload would be updated to (x,y). In some embodiments, the previous event payload (e.g., (a,b) in this example) is not maintained, e.g., it is archived, deleted or at least marked for deletion a short time afterwards, by the collaboration device because the data is considered ephemeral and not necessary for synchronizing the user experience of multiple viewers around activities of the presenter. Accordingly, each of the viewer devices 170A,170B can at any time access the last cursor position of the presenter device 170C with a very small amount of communicated data. Memory is used more efficiently because each of the viewer devices 170A, 170B can re-build or re-construct the latest point in the presentation based on the updated payload. Updates may also be broadcast and processed locally with greater efficiency. Viewer devices 170A, 170B effectively may simulate or re-create a current display of the file in the instance of the application on the presenting device.

With the presentation table updated with the newly received event data, the method continues to block 222 where an operation of determining if there are any subscribers to the shared state data for the collaboration event is performed. For example, subscribers to the channel for that particular collaboration event are identified. For example, in the embodiment of FIG. 6, viewers A and B are subscribers to the presentation. Accordingly, at block 224 the latest event data for the event type is transmitted to each of the subscribers (e.g., to each of the viewers A and B). With the latest event data transmitted to any subscribed viewer devices, the method returns to block 206 where additional requests from viewer devices to subscribe to the collaboration event may be received and then to block 208 where event data from the presenter device is periodically received.

In some embodiments, when the presenter completes a broadcast, the presenter may select an "end broadcast" button or close the tab window or session of the broadcast presentation. The presenter may then be asked to confirm that they would like to end the broadcast, which causes the presentation channel to no longer include shared state information, such as information regarding the presenter device and/or other viewer devices. Additionally, when the broadcast is ended, the presenter may be switched to an edit mode of the presentation or the presentation may be saved and closed. Similarly, when a broadcast is ended the viewers may automatically be switched to edit modes, which may still allow them to access artifacts within the presentation and navigate through the presentation, enabling continued collaboration albeit outside of a presentation.

While FIG. 2 is discussed with reference to the presenter transmitting event data to be collaboration device, viewer devices may also transmit event data to the collaboration device and, thus, may allow sharing of event data associated with the viewer devices with other devices participating in the broadcast. For example, each of the viewer devices 170A, 170B, may transmit event data to the collaboration device indicating a last artifact that the viewer interacted with (e.g., an object that the viewer selected). This event data may then be shared with the presenter device 170C, and/or other viewer devices, to provide an indication of which artifacts the viewers are currently interacting with, such as to allow the presenter to customize presentation based on interactions that are seen by the viewer devices.

In some embodiments, a presenter may handoff control to a presentation, such that one of the viewer devices may provide updates to the presentation table accessible via the presentation channel.

State Collaboration

As noted above, user (e.g., viewers) may subscribe to various endpoints (or "channels") to received shared state information. In some embodiments, a public event channel may be established to store and share information such as when each user is online/offline, when the presentation has started and ended, when the presenter hands off control to another user, and the like. In some embodiments, an artifact channel is generated for each artifact, and stores event data associated with state of that particular artifact. In some embodiments, an event channel (e.g., a presentation channel) is generated for each file that is shared, such as to store event data associated with the file and/or artifacts within the file. In some embodiments, a user state channel is generated for each user (e.g., the presenter and each viewer) and data regarding status of the users and/or interactions of the user with the file and/or artifacts of the file.

Depending on the embodiment, event channels (or endpoints) may be stored in various formats, such as the example table of FIG. 6. In other embodiments, events associated with an artifact may be stored as a tuples, such as storing for each event a user ID, device ID, artifact ID, event type, physical timestamp, logical timestamp, event payload, counter, and/or other attributes associated with the event. Event data may be stored in any other format.

In some embodiments, a user state may be maintained by the collaboration device, such as to allow authorized users (e.g., the presenter device 170C and/or possibly viewer devices 170) to access user state information for those participating in the broadcast. In some embodiments, each participant in a broadcast, such as the viewers 170A and 170B in the example of FIG. 1, provide user state information that may indicate when the user is online or offline, artifacts that are open by the user, when artifacts are closed by the user, and/or other attributes of or associated with the user. For example, a user state data structure may be generated for each user that participates in a broadcast (e.g., the presenter and the viewers) and store a user identifier, user status, open artifacts, and/or information regarding the open artifacts. In one embodiment, when the user state is changed, the user transmits updated user state data to the collaboration device. In some embodiments, if the user state has not been updated within a predetermined time period (e.g., every two minutes), the user state may be presumed offline and the user state table updated to indicate that the user is offline.

Example Shared State Information Display

In some embodiments, the shared state information regarding particular users, artifacts, files, etc. may be displayed to a user (e.g., a presenter or viewer) automatically and or made accessible to the user upon request. For example, information regarding users that subscribe to a particular endpoint may be accessed, such as whether each user is online and which artifacts each user is currently viewing. For example, the presenter may be provided with information, such as in a viewer status window, that "user A is currently viewing map A" and that "user B is currently viewing page 4 of the presentation)," and the like. Additionally, shared state information may be aggregated to provide information such as how many users are viewing a particular artifact and other shared attributes of those users. For example, the presenter (and/or other viewers) may be provided with information that "Map B has 70 viewers!" In some embodiments, portions of a viewer's environment may be shared with others, such as with the presenter and/or other viewers. For example, a viewer may authorize sharing of state information regarding a viewport on a shared map or graph, or may authorize sharing of state information regarding the users cursor position or selected objects in a shared document, or authorize sharing of state information regarding which slides or fields other people are viewing or editing in a shared presentation.

In some embodiments, viewer devices may only have access to certain presentation data, such as metadata indicating who the presentation leader is, who the followers of the presentation are, how much time has elapsed since the presentation began, and the like.

Example embodiments therefore describe an apparatus, computer-implemented method and system for collaboration and presentation, involving less data transfer over time via updates and which may permit interactions, including modifications, by viewers as well as by a presenter. Example embodiments enable users to view and interact with data in a more bandwidth efficient way.

Example Computing Environment

Figure 7:
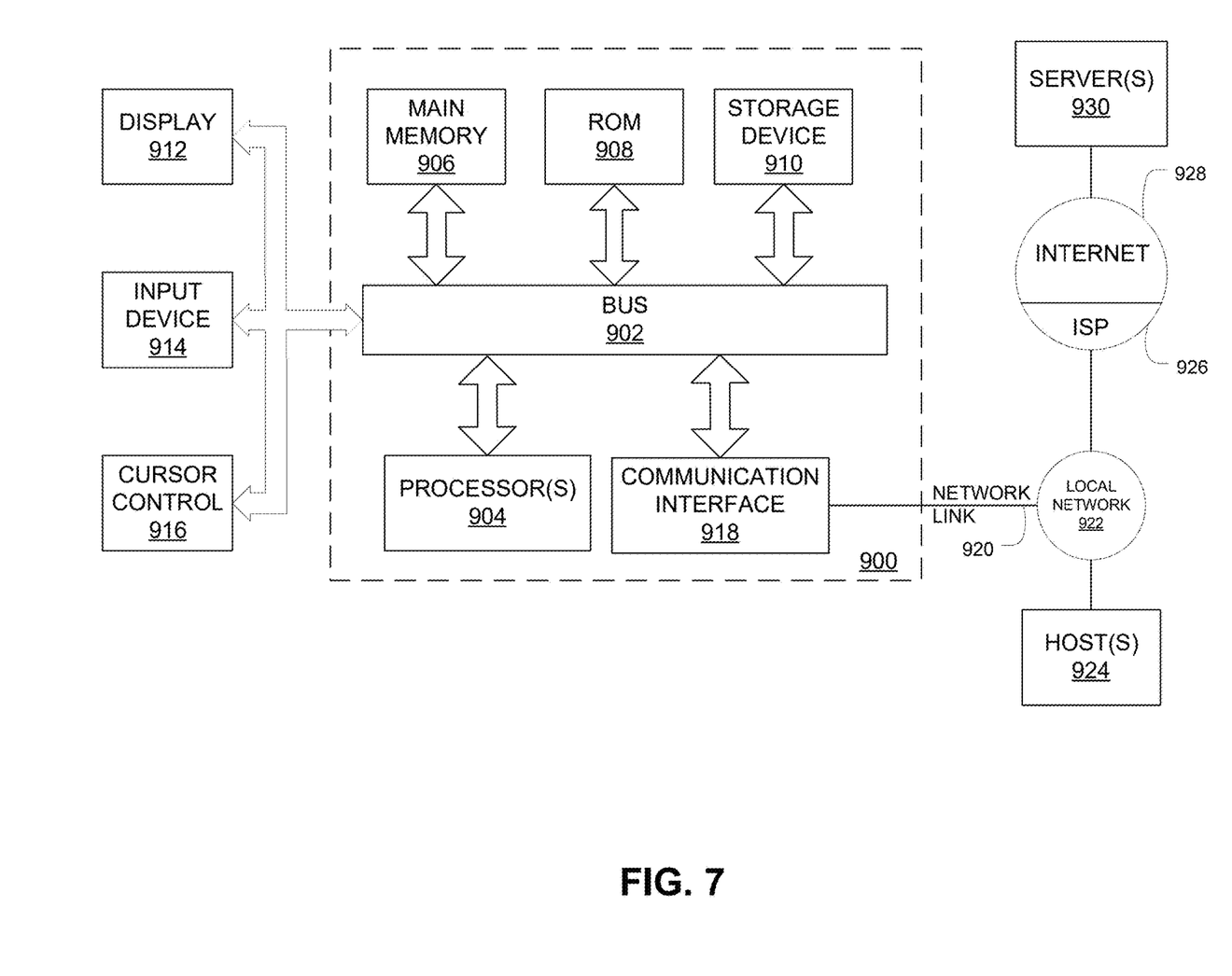
FIG. 7 is a block diagram that illustrates a computer system upon which various embodiments may be implemented.

FIG. 7 is a block diagram that illustrates a computer system 900 upon which various embodiments may be implemented. For example, each of the devices, such as the collaboration device 110, presenter device 170C, viewer devices 170A, 170B, and/or data store 150, may include some or all of the components illustrated with reference to computer system 900.

In the example of FIG. 7, the computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicate with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, declarative programming languages, such as SQL, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. Each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

Each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. However, no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

The invention claimed is:

1. A computerized method, performed by a computing collaboration device having one or more hardware computer processors and one or more non-transitory computer readable storage device storing software instructions executable by the collaboration device to perform the computerized method comprising:
   receiving, from a presenting device, a collaboration event indicating a file accessible via a first instance of an application on the presenting device;
   creating an event channel configured to store event data associated with ephemeral actions performed at the presenting device, wherein each event data includes at least an event type and an event payload;
   receiving, from a viewer device, a request to subscribe to an artifact channel associated with the collaboration event;
   authorizing the viewer device to access the artifact channel, wherein the viewer device accesses the file via a second instance of the application on the viewer device;
   periodically receiving, from the presenting device, event data;
   for each received event data:
      identifying an event type and an event payload;
      storing the event payload in place of any previously stored event payload associated with the event type;
      identifying one or more viewer devices subscribed to the artifact channel;
   periodically receiving requests from the viewer device for the latest event data associated with the artifact channel; and
   providing the requested latest event data to the viewer device, wherein the latest event data is usable by the second instance of the application to simulate a current display of the file in the first instance of the application on the presenting device.

2. The method of claim 1, wherein the file is one or more of a presentation, a document, a spreadsheet, database, or a map.

3. The method of claim 2, wherein the file includes one or more artifacts that are accessed from an artifact data store, wherein the first instance of the application and the second instance of the application separately access the one or more artifacts from the artifact data store.

4. The method of claim 3, wherein event data from the first instance of the application indicating a change to a first artifact of the one or more artifacts is implemented at the second instance of the application in response to receiving the latest event data at the viewer device.

5. The method of claim 3, wherein the artifacts each comprise one or more of a map, an image, a table, a text block, or an object.

6. The method of claim 1, wherein the event types include one or more of hovering, cursor position change, page change, selection of an artifact, resizing of an artifact, or changes to an artifact in the file.

7. The method of claim 1, further comprising:
   determining access rights of the viewer device to the application.

8. The method of claim 7, further comprising:
   determining access rights of the viewer device to the file.

9. The method of claim 1, wherein the event data further includes an object ID associate with an artifact.

10. The method of claim 1, wherein the collaboration device is configured to store, for each artifact associated with the file, an artifact table storing event data associated with the respective artifact.

11. The method of claim 10, wherein the artifact table stores indications of viewer devices or viewers that have the artifact open.

12. The method of claim 10, wherein the artifact table stores event data with custom event types associated with an artifact type.

13. The method of claim 1, wherein the collaboration device is configured to store, for each of the presenting device and the viewer device, a user state table indicating status of the respective user.

14. The method of claim 13, wherein the user state tables store an indication of whether the respective user is online or offline.

15. The method of claim 10, wherein the artifact table stores event data with custom event types associated with an artifact type.

16. A collaboration device comprising:
    a hardware computer processor;
    a non-transitory computer readable medium having software instructions stored thereon, the software instructions executable by the hardware computer processor to cause the collaboration device to perform operations comprising:
    receiving, from a presenting device, a collaboration event indicating a file accessible via a first instance of an application on the presenting device;
       creating an event channel configured to store event data associated with ephemeral actions performed at the presenting device, wherein each event data includes at least an event type and an event payload;

receiving, from a viewer device, a request to subscribe to an artifact channel associated with the collaboration event;

authorizing the viewer device to access the artifact channel, wherein the viewer device accesses the file via a second instance of the application on the viewer device;

periodically receiving, from the presenting device, event data;

for each received event data:
- identifying an event type and an event payload;
- storing the event payload in place of any previously stored event payload associated with the event type;
- identifying one or more viewer devices subscribed to the artifact channel;

periodically receiving requests from the viewer device for the latest event data associated with the artifact channel; and providing the requested latest event data to the viewer device, wherein the latest event data is usable by the second instance of the application to simulate a current display of the file in the first instance of the application on the presenting device.

17. The collaboration device of claim 16, wherein the file is one or more of a presentation, a document, a spreadsheet, database, or a map.

18. The collaboration device of claim 17, wherein the file includes one or more artifacts that are accessed from an artifact data store, wherein the first instance of the application and the second instance of the application separately access the one or more artifacts from the artifact data store.

19. The collaboration device of claim 18, wherein event data from the first instance of the application indicating a change to a first artifact of the one or more artifacts is implemented at the second instance of the application in response to receiving the latest event data at the viewer device.

20. The collaboration device of claim 18, wherein the artifacts each comprise one or more of a map, an image, a table, a text block, or an object.

* * * * *